United States Patent [19]

Kikuchi

[11] Patent Number: 5,389,914
[45] Date of Patent: Feb. 14, 1995

[54] ANTI-DISASTER MONITORING SYSTEM AND ANTI-DISASTER MONITORING METHOD

[75] Inventor: Masamichi Kikuchi, Ayase, Japan

[73] Assignee: Hochiki Kabushiki Kaisha, Tokyo, Japan

[21] Appl. No.: 755,687

[22] Filed: Sep. 5, 1991

[30] Foreign Application Priority Data

Sep. 6, 1990 [JP] Japan .................. 2-236070
Sep. 6, 1990 [JP] Japan .................. 2-236072

[51] Int. Cl.$^6$ .................. G08B 26/00; G05B 23/02
[52] U.S. Cl. .................. 340/518; 340/505; 340/825.12
[58] Field of Search ....... 340/518, 505, 825.06–825.12

[56] References Cited

U.S. PATENT DOCUMENTS

| | | | |
|---|---|---|---|
| 3,508,260 | 4/1970 | Stein .................. | 340/505 |
| 3,806,872 | 4/1974 | Odom .................. | 340/505 |
| 4,019,172 | 4/1977 | Srodes .................. | 340/505 |
| 4,071,908 | 1/1978 | Brophy et al. .................. | 340/825.02 |
| 4,206,449 | 6/1980 | Galvin et al. .................. | 340/505 |
| 4,400,694 | 8/1983 | Wong et al. .................. | 340/518 |
| 4,410,883 | 10/1983 | Swiston, Sr. .................. | 340/505 |
| 4,586,040 | 4/1986 | Akiba et al. .................. | 340/505 |
| 4,742,335 | 5/1988 | Vogt .................. | 340/518 |
| 4,996,518 | 2/1991 | Takahashi et al. .................. | 340/825.08 |
| 5,061,922 | 10/1991 | Nishijima et al. .................. | 340/825.08 |
| 5,101,199 | 3/1992 | Suzuki .................. | 340/825.12 |

FOREIGN PATENT DOCUMENTS 0050451 4/1982 European Pat. Off. .
0381018 1/1990 European Pat. Off. .

Primary Examiner—Donnie L. Crosland
Attorney, Agent, or Firm—Lackenbach Siegel Marzullo Aronson & Greenspan

[57] ABSTRACT

An anti-disaster system for receiving terminal data in response to the sequential calling of the terminals which is achieved by designating addresses from a receiver and for performing alarming or the like. Each of the terminals has an interrupt transmission section for transmitting a break signal which invalidates a terminal response signal on a timing when the terminal response signal to the receiver is transmitted when an abnormality is detected to notify generation of an interrupt. The receiver includes an interrupt detection section for detecting an interrupt of a terminal when it receives the break signal at a timing when the terminal response signal is received, and a calling control section for specifying the terminal in which abnormality data is detected, the specification being achieved by transmitting the calling signals for interrupt confirmation to the terminals when an interrupt detection output is obtained from said interrupt signal detection section to allow the terminal to transmit the terminal response signal containing an interrupt level signal which indicates the cause of generation of the interrupt and by performing sequential group calling of the terminals on the basis of the order of priority of the interrupt level signal. Consequently, when urgent data is detected at the terminal end, terminal data can be received quickly independently of the sequential calling and generation of an abnormality can be determined.

8 Claims, 14 Drawing Sheets

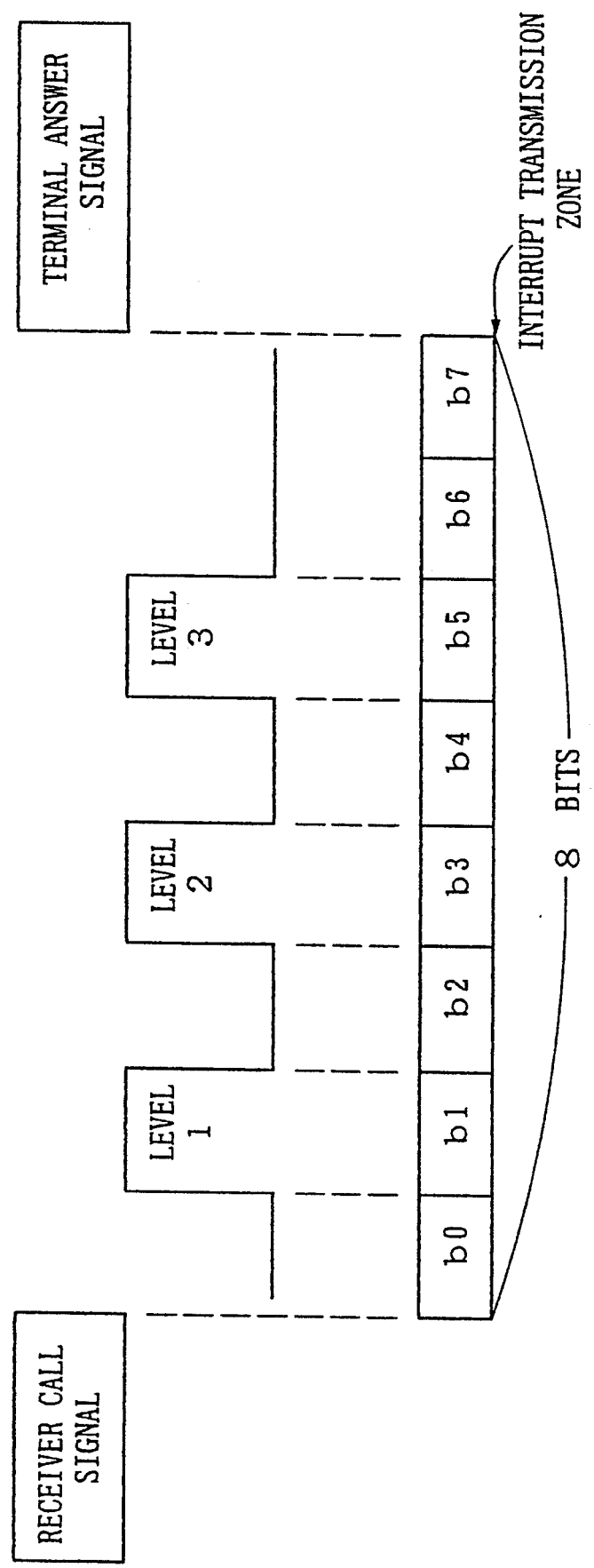

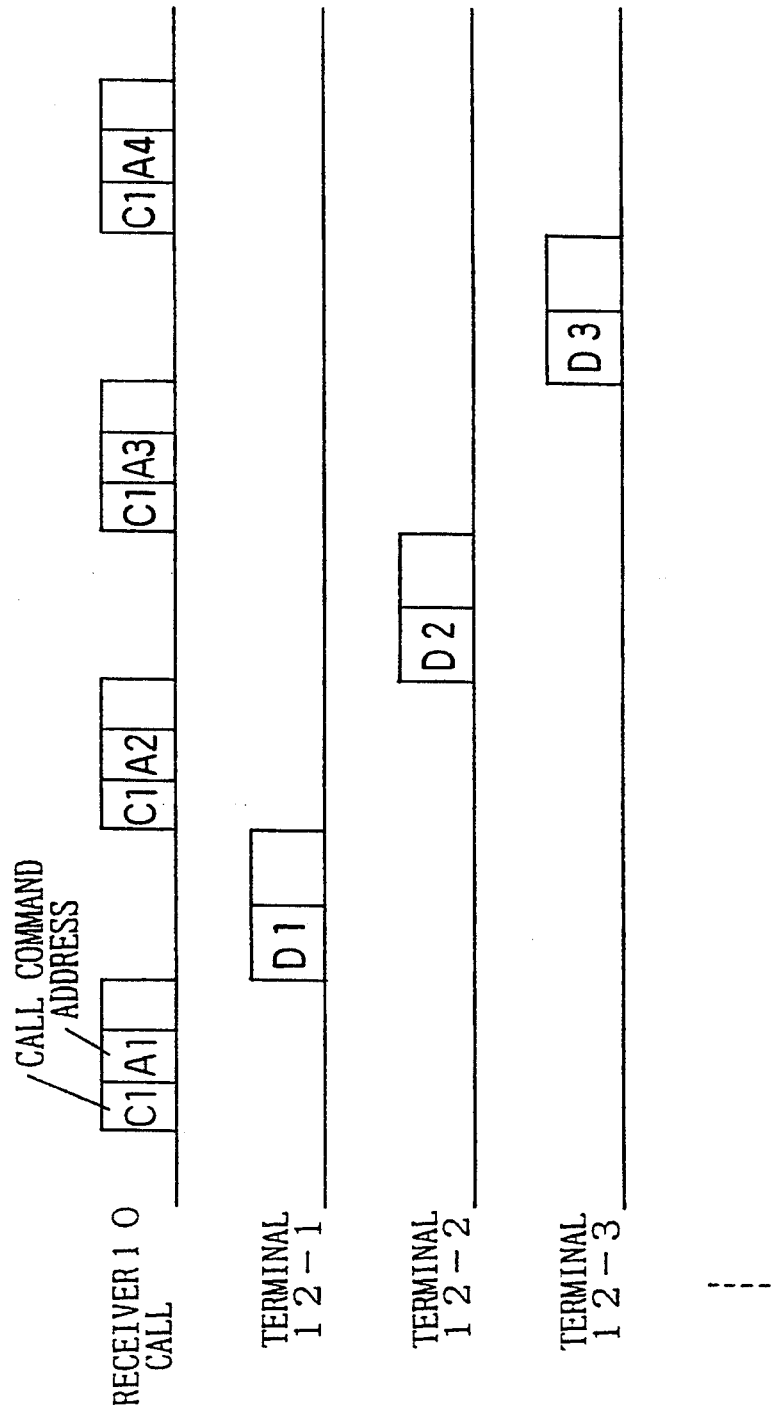

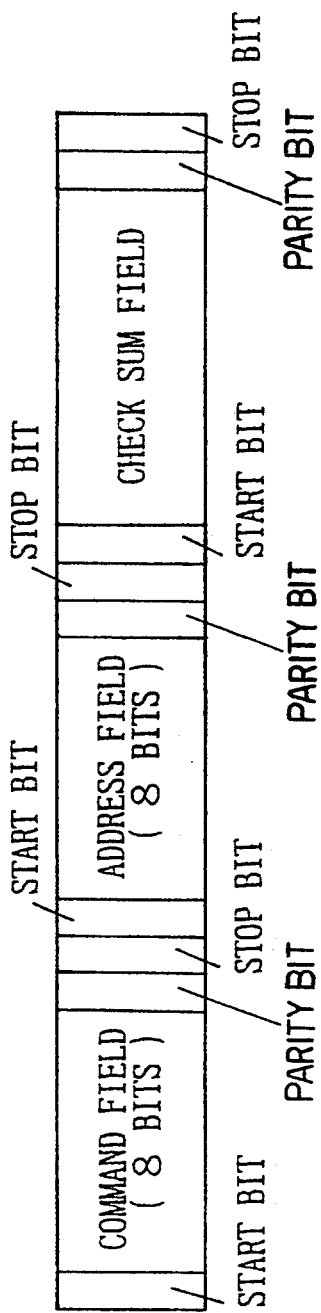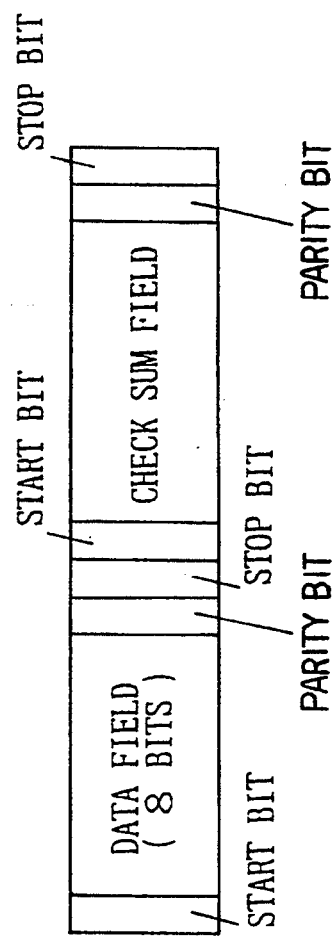

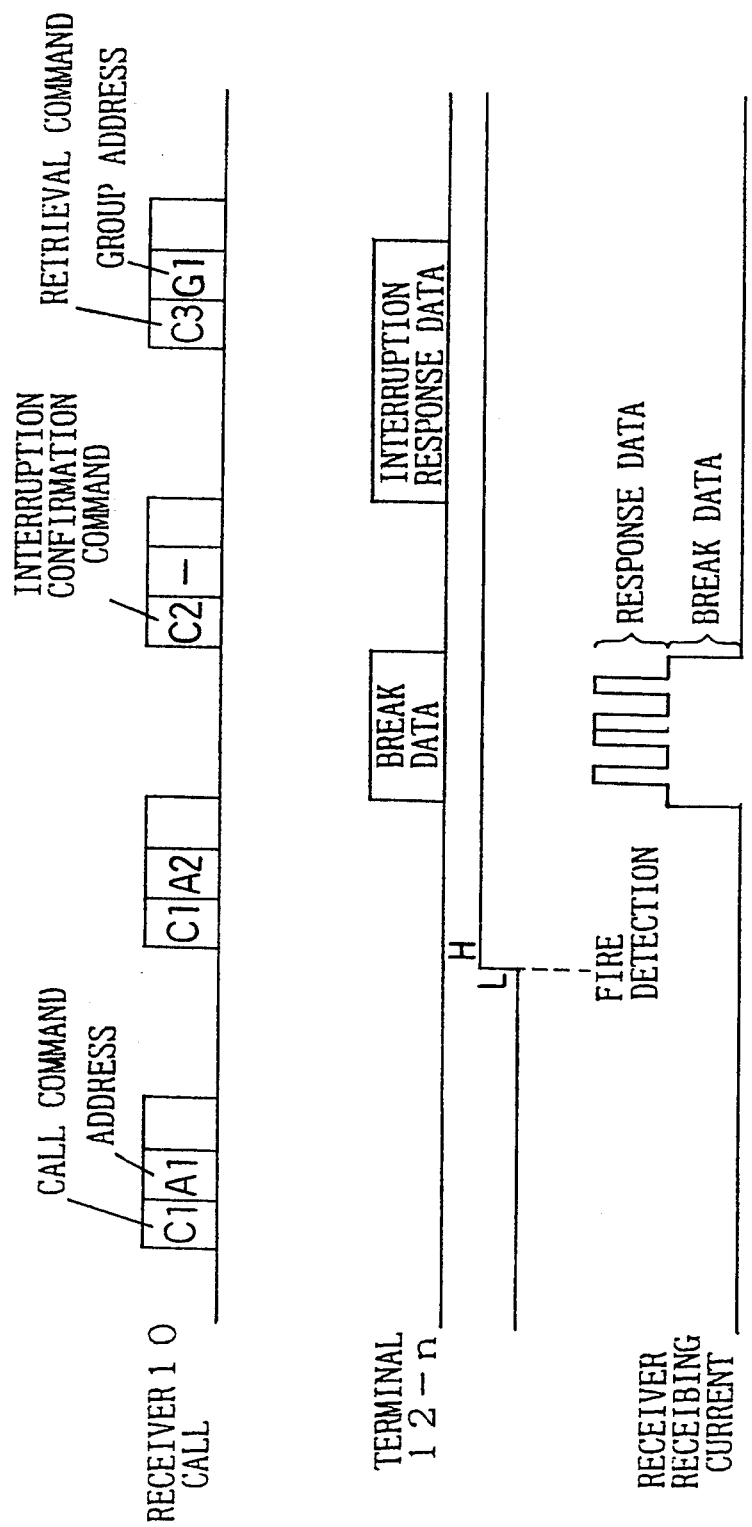

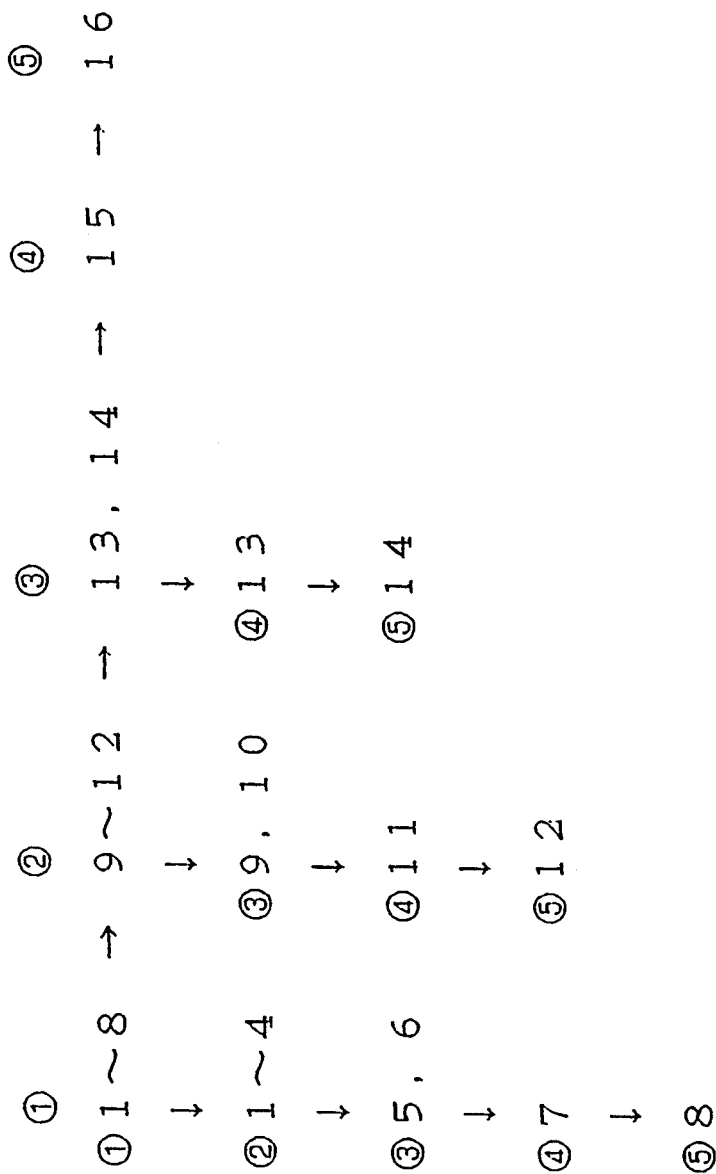

ANTI-DISASTER MONITORING SYSTEM AND ANTI-DISASTER MONITORING METHOD

BACKGROUND OF THE INVENTION

1. Field of the Invention

The present invention relates to an anti-disaster monitoring system for monitoring abnormalities, such as fires, by receiving terminal information from fire sensors or the like by means of a receiver and by processing the received information. More particularly, the present invention pertains to an anti-disaster monitoring system in which terminal information is received from terminals which are called in sequence by a receiver which designates the address of the terminal and in which alarming or the like is performed on the basis of the received information.

2. Description of the Related Art

Conventional fire monitoring systems adopt polling in which a plurality of terminals are called in sequence by a receiver which designates the address of the terminal. That is, each of the plurality of terminals has an address which identifies that terminal. The receiver sequentially sends to the individual terminals a calling signal which designates the terminal's address. A terminal in which an abnormality, such as a fire, is detected, awaits the transmission of its address. When the address sent from the receiver coincides with the address of that terminal, the terminal transmits fire detection information or the like to the receiver during a response period which follows the call.

In such a conventional fire monitoring system which adopts the polling system, when there are few terminals, fire alarming can be made without delay. However, when the number of terminals is great, the time required to poll the terminals is proportional to the number of terminals and is thus longer. Therefore, after a fire is detected, determination and alarming of a fire by the receiver may be delayed.

When a fire transmitter is connected to a terminal, there is almost no possibility of false information.

However, in the conventional anti-disaster monitoring system of this type, operation of a fire transmitter is detected by polling, as in the aforementioned anti-disaster monitoring system, and then fire alarms are activated. As a result, after the fire transmitter is operated, activation of the alarm is delayed. This may make the fire informer (operator) anxious.

Particularly, in the case of the dual consecutive transmission collation system in which a fire is determined after fire detection information is received twice in sequence, since response signals received in response to the two calling signals are collated, activation of a fire alarm is further delayed.

SUMMARY OF THE INVENTION

In view of the aforementioned problems of the conventional systems, an object of the present invention is to provide an anti-disaster monitoring system which is capable of receiving terminal information quickly independently of sequential calling when urgent information is detected at a terminal so as to perform determination of generation of an abnormality.

To achieve this object, the present invention provides an anti-disaster monitoring system in which a plurality of terminals 12-1, 12-2, . . . (hereinafter simply referred to as "terminal 12") is connected to a receiver 10 through a transmission path 14, in which the receiver 10 calls the terminals 12 in sequence by transmitting calling signals each of which designates the address of the terminal, in which the terminal 12 transmits a terminal response signal when the calling address coincides with a self address of the terminal, and in which the receiver 10 decodes the received terminal response signal and performs alarming or the like, In the anti-disaster monitoring system according to the present invention, each of the terminals has an interrupt transmitting section 16 for transmitting a break signal which invalidates the terminal response signal on a timing when the terminal response signal is transmitted to the receiver 10 from any of the terminals when an abnormality is detected to notify generation of an interrupt. The receiver 10 has a calling control means 20 for specifying the terminal in which the abnormality data is detected by sequentially conducting the group calling of the terminals 12 when an interrupt detection output is obtained from an interrupt detection section 18 for detecting an interrupt of the terminal when it receives the break signal on a timing when the terminal response signal is received.

The receiver 10 transmits a calling signal for interrupt confirmation to the terminals 12 when it determines an interrupt from the break signal received by the interrupt detection section 18 to allow the terminal to return an interrupt response signal indicating the cause of generation of the interrupt.

The terminal 12 has a transmission control section 54 for setting an interrupt transmission time having a predetermined period of time in which a plurality of interrupt pulses are sequentially transmitted in a state in which the interrupt pulses are separated from each other by an empty time and for selecting and transmitting the specific interrupt pulse corresponding to the type of detection data when an abnormality is detected.

In the anti-disaster monitoring system according to the present invention, when urgent terminal data, such as a fire or a gas leakage, is detected in a particular terminal, that terminal transmits a break signal which invalidates the terminal response signal at the receiver end and thereby generates an interrupt relative to the receiver. This allows the receiver to quickly execute the group calling process to specify the terminal in which the abnormality is detected on the basis of the interrupt. As a result, the processing time required for the receiver to make a determination after an abnormality is detected in a terminal can be shortened, and quick processing, such as alarming, can be performed.

Furthermore, when an interrupt is detected, an interrupt confirmation calling is performed to allow the terminal to return the detailed data indicating the cause of generation of the interrupt in the form of an interrupt level signal indicating the order of priority of the abnormality detection data as well as the cause of an interrupt, i.e., to allow the terminal to inform whether the cause of generation of the interrupt is the operation of a fire transmitter or a fire detection signal from a fire sensor. Consequently, it is possible to take adequate measures corresponding to the detected abnormality.

When the cause of an interrupt is, for example, the detection data of a fire transmitter, since there is no possibility that the information is false, prealarming is made first by, for example, activating a fire alarm, and then a terminal in which an abnormality is detected is specified by group calling.

Therefore, the fire alarms are activated immediately after the fire transmitter is operated. This does not make the operator anxious.

Since a plurality of interrupt pulses having different interrupt levels are sequentially transmitted in a state in which they are separated from each other by empty times, even when the transmission timing of the interrupt pulses varies in each terminal or even when a phase shift occurs due to the transmission characteristics, the adjacent interrupt pulses do not interfere with each other and the interrupt pulses and the pulse timing can accurately be detected on the receiver end. This allows adequate processes to be conducted on the receiver end on the basis of the interrupt level.

BRIEF DESCRIPTION OF THE DRAWINGS

FIG. 3 illustrates how the interrupt transmission time is set in an interrupt response signal as well as the interrupt levels thereof in the present invention;

FIG. 4 is a timing chart of the calling and response processes executed in a normal monitoring state in the present invention;

FIG. 5 illustrates the format of a calling signal used in the present invention;

FIG. 6 illustrates the format of a response signal used in the present invention;

FIG. 7 is a timing chart of the calling and response processes executed when a fire is detected in the present invention;

FIG. 8 illustrates the dichotomy method used in the group retrieval in the present invention;

DETAILED DESCRIPTION OF THE PREFERRED EMBODIMENTS

Figure 1:
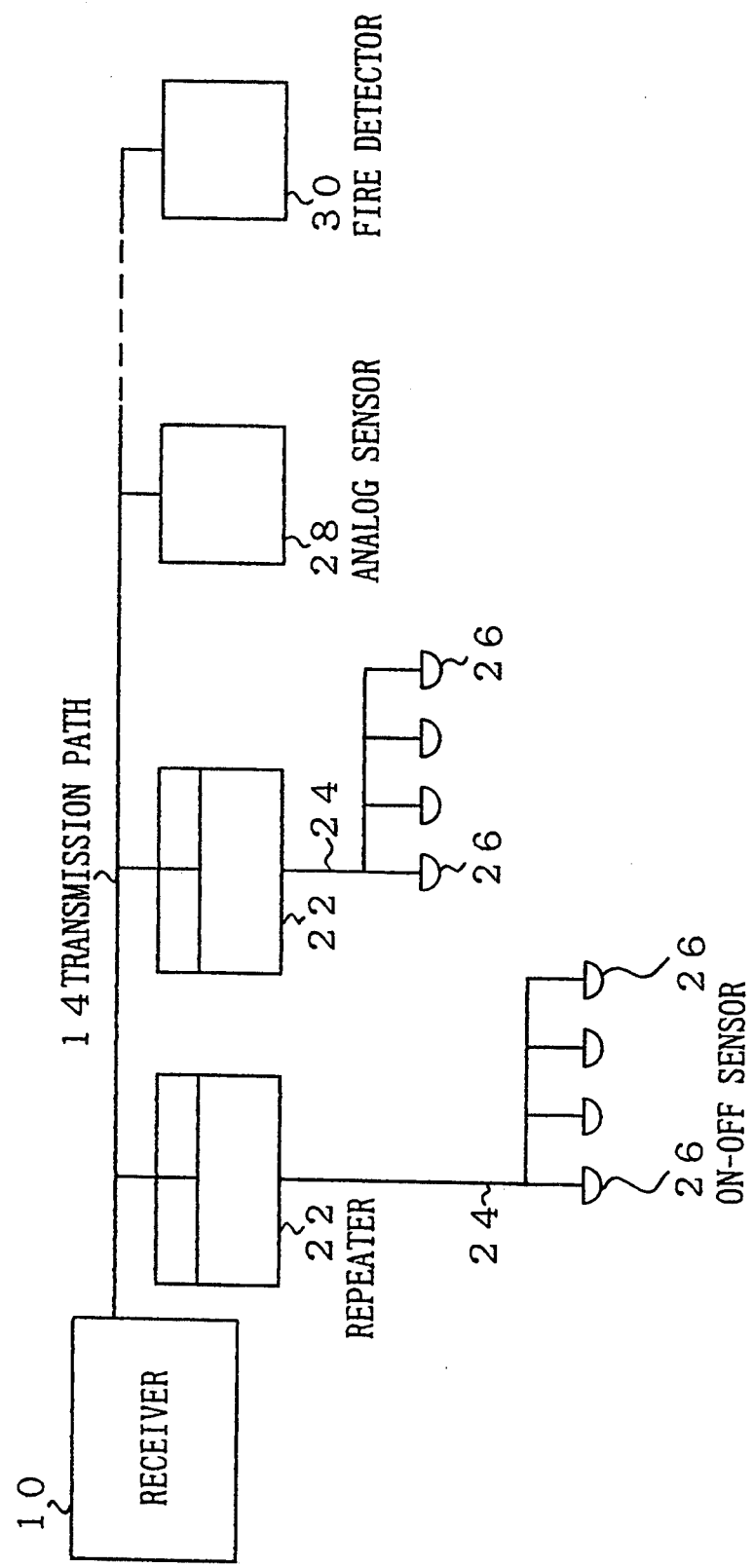
FIG. 1 shows the configuration of the present invention.

FIG. 1 shows the configuration of an anti-disaster monitoring system according to the present invention. The anti-disaster monitoring system shown in FIG. 1 includes a receiver 10, a transmission path 14 drawn from the receiver 10, and terminals, such as relaying devices 22, an analog sensor 28 and a fire transmitter 30, connected to the transmission path 14. The analog sensor 28 may be an analog heat or smoke sensor. Each of the terminals has an inherent address. A power source/signal line 24 is drawn from each of the relaying devices 22, and on-off sensors 26 are connected to the power source/signal line 24. The receiver 10 sends out call signals and thereby designates the addresses of the individual terminals, including the relaying devices 22, the analog sensor 28 and the fire transmitter 30, in sequence. The anti-disaster monitoring system according to the present invention adopts the polling system. Therefore, a terminal sends out a response signal representing the terminal detection information obtained at that time when it receives the call signal and the received address coincides with the address of that terminal. This invention is characterized in that an interrupt signal is sent out from the terminal in which an urgent abnormality is detected to the receiver 10 during the polling operation to inform generation of an abnormality. Since the relaying devices 22, the analog sensor 28 and the fire transmitter 30 act as the terminals relative to the receiver 10, they are simply called terminals in the following description.

Figure 2:
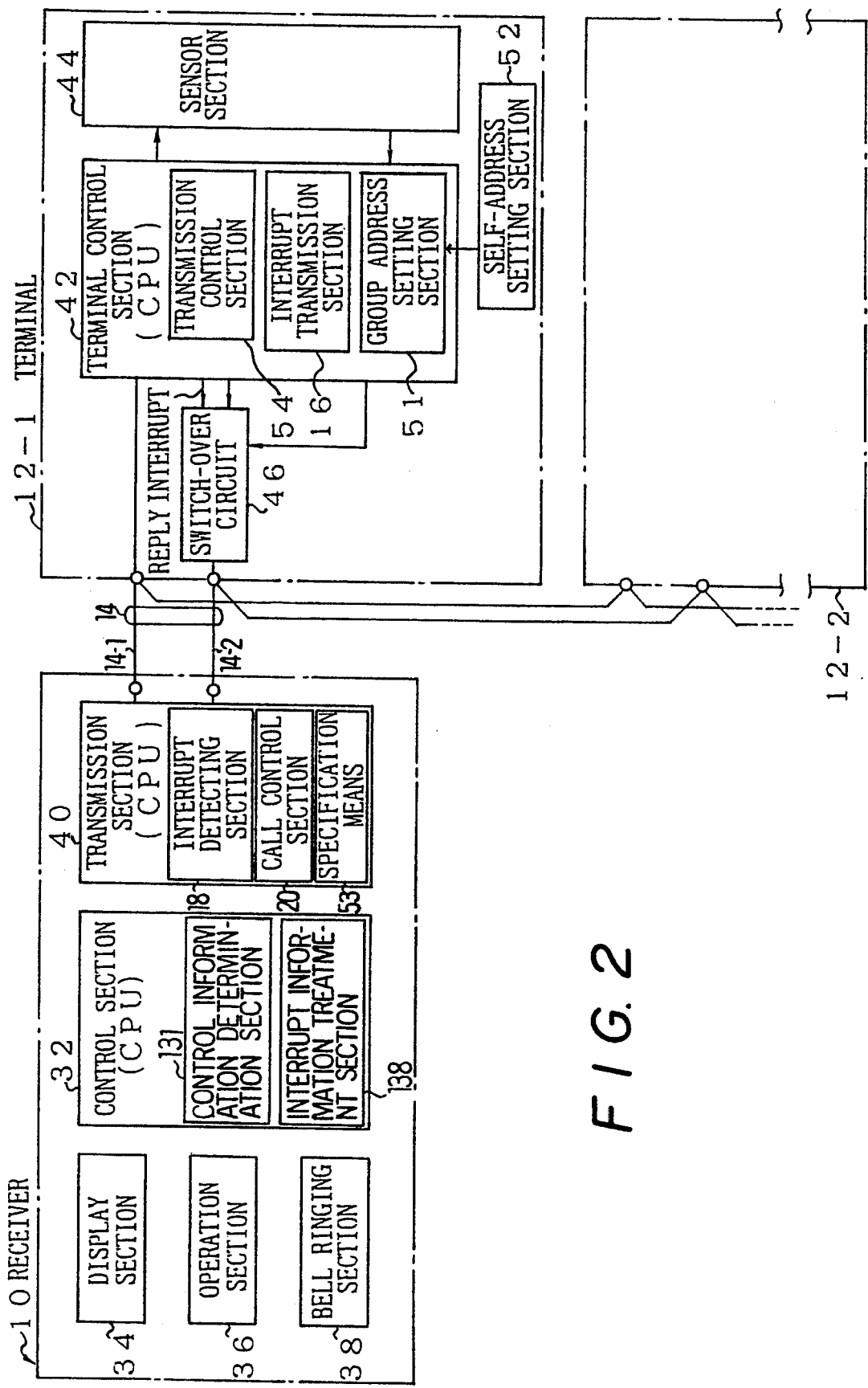
FIG. 2 shows the structure of an embodiment of the present invention.

FIG. 2 shows an embodiment of the present invention.

In the embodiment shown in FIG. 2, a plurality of terminals 12-1, 12-2, . . . are connected to the transmission path 14 drawn from the receiver 10. The transmission path 14 is virtually divided into a calling line 14-1 and a response line 14-2. That is, in the embodiment of the present invention, a calling signal is transmitted from the receiver 10 to the terminal via the calling line 14-1 in the voltage mode, and a response signal is transmitted from the terminal to the receiver 10 via the response line 14-2 in the current mode. Although the transmission path 14 is a single circuit which is made up of two signal lines, the calling signal transmitted in the voltage mode can virtually be indicated as the calling line 14-1 separately from the response line 14-2.

In the receiver 10, a control section 32 which is constituted by a central processing unit is connected to a display section 34, an operation section 36 and a bell activating section 38. Also, a transmission section 40 constituted by a central processing unit is provided between the control section 32 and the transmission path 14. Both the control section 32 and the transmission section 40 may be formed by a single central processing unit.

Each of the terminals 12-1, 12-2, . . . includes a terminal control section 42 which is constituted by a central processing unit, a sensor section 44 which is made up of the of-off sensors 26 and the fire transmitter 30, and a switchover circuit 46 for switching over a terminal response signal sent out to the response line 14-2 and a break signal for informing an interruption to the receiver 10. The sensor section 44 is constituted by the detection section of each of the on-off sensors 26, the analog sensor 28 and the fire transmitter 30 shown in FIG. 1, which outputs to the terminal control section 42 a fire detection signal on the basis of the detection principle or operation inherent therein.

In the present invention, the terminal control section 42 contains an interrupt transmission section 16 which is achieved by the program control of the central processing unit. When the interrupt transmission section 16 receives an abnormality detection output, such as a fire detection output or a gas leakage detection output, from the sensor section 44, it sends out through the switchover circuit 46 a break signal which invalidates the terminal response signal at the receiving end at a time when the terminal response signal is sent out to the receiver 10 in response to the calling signal from the receiver 10. When the break signal is sent out from the interrupt transmission section 16 to inform generation of an interrupt, the receiver 10 sends back a calling signal for interrupt confirmation. Upon receipt of this calling signal, the interrupt transmission section 16 sends out to the receiver 10 detailed information as a terminal response signal, indicating the cause of generation of the interrupt, that is, whether the interrupt is generated by the output of the fire transmitter or fire sensor or whether the analog detection signal of the analog sensor has exceeded a prealarming level at which a fire determination is started.

As shown in FIG. 3, an interrupt transmission period is provided between the receiver calling signal and the terminal response signal. In this embodiment, the interrupt transmission period is divided into 8 bits, from bit b0 to bit 7. The period of each bit is about 1 ms. In this embodiment, there are three interruption levels, from level 1 to level 3. Level 1 represents the fire detection output of the fire transmitter. Level 2 indicates the detection output of the fire sensor or gas leakage sensor. Level 3 means that the analog detection signal of the analog sensor has exceeded a prealarming level at which the receiving end starts determination of a fire.

The three interrupt pulses corresponding to these three interrupt levels 1 to 3 are respectively allocated to bit b1, b3 and b5, as shown in FIG. 3. The interrupt pulses, the receiver calling signal and the terminal response signals are separated from each other by empty bits b0, b2, b4, b6 and b7. The terminal control section 42 also includes a group address setting section 51, which is connected to a selfaddress setting section 52 formed by a DIP switch or the like. The self address of the terminal is determined by operating the DIP switch of the self-address setting section 52. The group address setting section 51 determines a group address corresponding to the self-address.

In the receiver 10, the transmission section 40 includes an interrupt detecting section 18 which monitors terminal response signals sent from the terminals in response to the calling signals. When the interrupt detection section 18 detects as the terminal response signal a signal consisting of pulses having only the logical high levels, it recognizes it as an interrupt signal. The transmission section 40 includes a call controlling section 20 which is achieved by the program control of the central processing unit. In the normal monitoring state, the calling control section 20 sends out calling signals each of which consists of a calling command and a calling address of each terminal. The transmission section 40 also includes a specification means 53 for specifying the terminal in which an abnormality is detected by the group retrieval or in-group separate address retrieval.

When the calling control section 20 receives an interruption detection output from the interrupt detection section 18, it sends out to the terminals a calling signal containing an interrupt confirmation request. The calling control section 20 also decodes the cause of generation of the interrupt from the terminal response signal received from the terminal in response to the interrupt confirmation request, and executes the corresponding processing. If the cause of generation of the interrupt is the detection output of the fire transmitter, an interrupt information is transmitted to the control section 32. The control information determination section 131 in the control section 32 determines an information level of it and a control device corresponding to the level. The interrupt information treatment section 138 operates the fire alarm ringing section 38 to activate fire alarms, and then in the trasmission section 40 executes the group calling process to specify the terminal in which the abnormality is detected. If the cause of generation of the interrupt is the detection output of the analog sensor, on-off sensors or gas sensors, the calling control section 20 executes the group calling process to specify the terminal in which an abnormality is generated without activating the fire alarm.

In this embodiment, the cause of generation of an interrupt is divided into three levels, from interrupt level 1 to interrupt level 3, as stated above. That is, interrupt level 1 represents the fire detection output of the fire transmitter, interrupt level 2 indicates the detection output of the fire sensor or gas leakage sensor, and interrupt level 3 indicates that the analog detection signal of the analog sensor has exceeds the prealarming level at which the fire determination is started at the receiving end. The interrupt levels 1 to 3 also indicate the order of priority of interrupts. When two or more interrupt confirmation information having different levels are received at the same time, priority is given to the interrupt level having a higher order of priority. That is, if interrupt levels 1 and 2 are received at the same time, the interrupt level 1 is processed first.

FIG. 4 is a timing chart of the calling and response processes executed in a normal monitoring state in the embodiment shown in FIG. 2.

In FIG. 4, the receiver 10 sequentially sends out calling signals each of which contains a calling command C1 and a terminal address A1, A2, A3, A4 . . . .

As shown in FIG. 5, the calling signal consists of an 8 bit command field, an 8-bit address field and a 8-bit check sum field. The individual bytes are separated from each other by start, parity and stop bits. The command field is used to indicate to all the terminals what the calling signal from the receiver 10 indicates regardless of the address. In this case, upper 4 bits in the 8 bits indicate the type of a command, and lower 4 bits are allocated to a binary code representing the contents of the command. In a practical operation, the calling command shown in FIG. 4, an interrupt confirmation command C2 and a retrieval command C3, which will be described later with reference to FIG. 7, are used. A command data representing activation of fire alarms may also be used.

Turning to FIG. 4 again, when the address contained in the calling signal from the receiver 10 coincides with the address of a terminal, that terminal sends out a terminal response signal. The terminals 12-1, 12-2, 12-3, . . . therefore send out the terminal response signals in sequence.

As shown in FIG. 6, the terminal response signal consists of an 8-bit data field and 8-bit check sum field. A start bit indicates the beginning of each byte, and a parity bit and a stop bit occurs at the end of each byte.

In the normal monitoring state shown in FIG. 4, when the address A1, A2, . . . in the calling signal from the receiver 10 coincides with the self address of the terminal 12-1, 12-2, . . . , the terminal 12-1, 12-2, . . . sends out a response signal containing data D1, D2, . . . . The data D1, D2, D3, . . . in the terminal response signals shown in FIG. 4 may be data representing the state of that terminal in the normal monitoring state, i.e., data other than the abnormality detection data, for example, data representing a normal state.

FIG. 7 is a timing chart of the calling and response processes executed when a fire, e.g., an output of the fire transmitter, is detected in the terminal 12-n in the embodiment shown in FIG. 2.

In FIG. 7, when a fire is detected in the terminal 12-n by switching on the fire transmitter, the interrupt transmission section 16 of the terminal 12-n sends out break data consisting of pulses having only logical high levels in the current mode at a time when a terminal response signal is transmitted in response to the calling signal sent out from the receiver 10 first after the detection of the fire and having a calling command C1 and an address A2, is to be send out. At that time, the terminal 12-2 having the address A2 sends out a terminal response signal to the receiver 10 concurrently with the transmission of the break data. Therefore, the receiver 10 receives a current in which the response data from the terminal 12-2 is superimposed on the break data consisting of pulses having only the logical high levels, as shown in FIG. 7.

The terminal response signal is invalidated by the break data from the terminal 12-n, and a resultant terminal response signal consisting of pulses having only logical high levels is received by the receiver 10. The interrupt detection section 18 generates an interrupt detection output when it receives the break data consisting of pulses having only logical high levels.

Break data from the terminal 12-n is transmitted in response to the calling signal having the calling command C1 alone. That is, transmission of the interrupt data is not performed in response to other commands, such as an interrupt confirmation command C2.

When the receiver 10 detects an interrupt on the basis of the break data, it sends out to the terminals an interrupt confirmation request in which an interrupt confirmation command C2 is set in the command field of a subsequent calling signal.

The interrupt confirmation command C2 is received by all the terminals 12-1 to 12-n. At that time, the terminal 12-n in which a fire is detected transmits interrupt response data as a terminal response signal in response to the interrupt confirmation request made on the basis of the interrupt confirmation command. The interrupt response data indicates the cause of generation of the interrupt. In the case shown in FIG. 7, interrupt response data having the interrupt level 1, indicating the fire detection output of the fire transmitter, is transmitted.

If the cause of generation of the interrupt is the detection output of the fire sensor or gas sensor, interrupt response data having the interrupt level 2 is transmitted. If the detection output of the analog sensor has exceeded the prealarming level, interrupt response data having the interrupt level 3 is transmitted.

When the receiver 10 receives the interrupt response data, it decodes the interrupt response data and performs the corresponding processing. That is, if the interrupt level 1, indicating the fire detection output of the fire transmitter, is received, the receiver 10 activates the fire alarms, and then instructs group calling by sending out a subsequent calling signal in which a retrieval command C3 is set in the command field and in which the first group address G1 is set in the address field. If the detection output of the fire or gas sensor is determined from the interrupt response data, the receiver sends out a calling detection signal consisting of a retrieval command C3 and a group address G1 to perform the first group calling without activating the fire alarms.

In the group calling performed to specify the abnormality detecting terminal using the retrieval command C3 after the cause of the interrupt is clarified from the received interrupt response data, the terminals are divided into groups each consisting of, for example, eight terminals. Each group has a group address G1, G2, G3, . . . inherent therein. Group calling is performed by sequentially designating the group addresses. When the group address of the group containing the terminal 12-n from which break data is transmitted is designated in the group calling, a group response, indicating that that terminal exists in the group, is received, and the receiver recognizes that the group from which group response is received is the abnormality detecting group. Thereafter, the receiver specifies the terminal in that group in which the abnormality is detected by sequentially designating the separate addresses in the group.

Besides the group calling in which the terminals are divided into groups each consisting of the same number of terminals, a group calling may also be performed by the dichotomy shown in FIG. 8.

In the example shown in FIG. 8, the group calling by the dichotomy shown in FIG. 8 is performed on 16 terminals. In the dichotomy method, the number of terminals to be called is reduced first from 16 to 8, then from 8 to 4, 4 to 2 and then 2 to 1 in sequence to specify the terminal in which an abnormality is detected.

Assuming that 16 terminal addresses are, for example, 1 to 16, a group consisting of the terminal addresses 1 to 8 is first called, as indicated by (1) in FIG. 8. If a response is received from that group, the flow proceeds downward, and the number of terminals to be called is halved and a group consisting of the terminal addresses 1 to 4 is called, as indicated by (2). If a response is not received from that group, the number of terminals to be called is further halved, and the terminal addresses, 5 and 6, are called, as indicated by (3). If a response is not received from that group, the number of terminal addresses is further halved, and the terminal address 7 is called. If a response is not received from the terminal address 7, the terminal address 8 is called. If a response is not received when the group consisting of the addresses 1 to 8 is called in (1), the flow proceeds sideways, and a group consisting of 4 terminals having addresses 9 to 12 is called, as indicated by (2). If a response is not received from that group, the number of terminals to be called is halved, and the terminal addresses 13 and 14 are called, as indicated by (3). Thereafter, the terminal addresses 15 and 16 are sequentially called, as indicated by (4) and (5).

In the group calling by the dichotomy method, when the number of terminals is 16, the terminal in which an abnormality is detected can be specified by calling the terminal groups over five stages at maximum.

Figure 9:
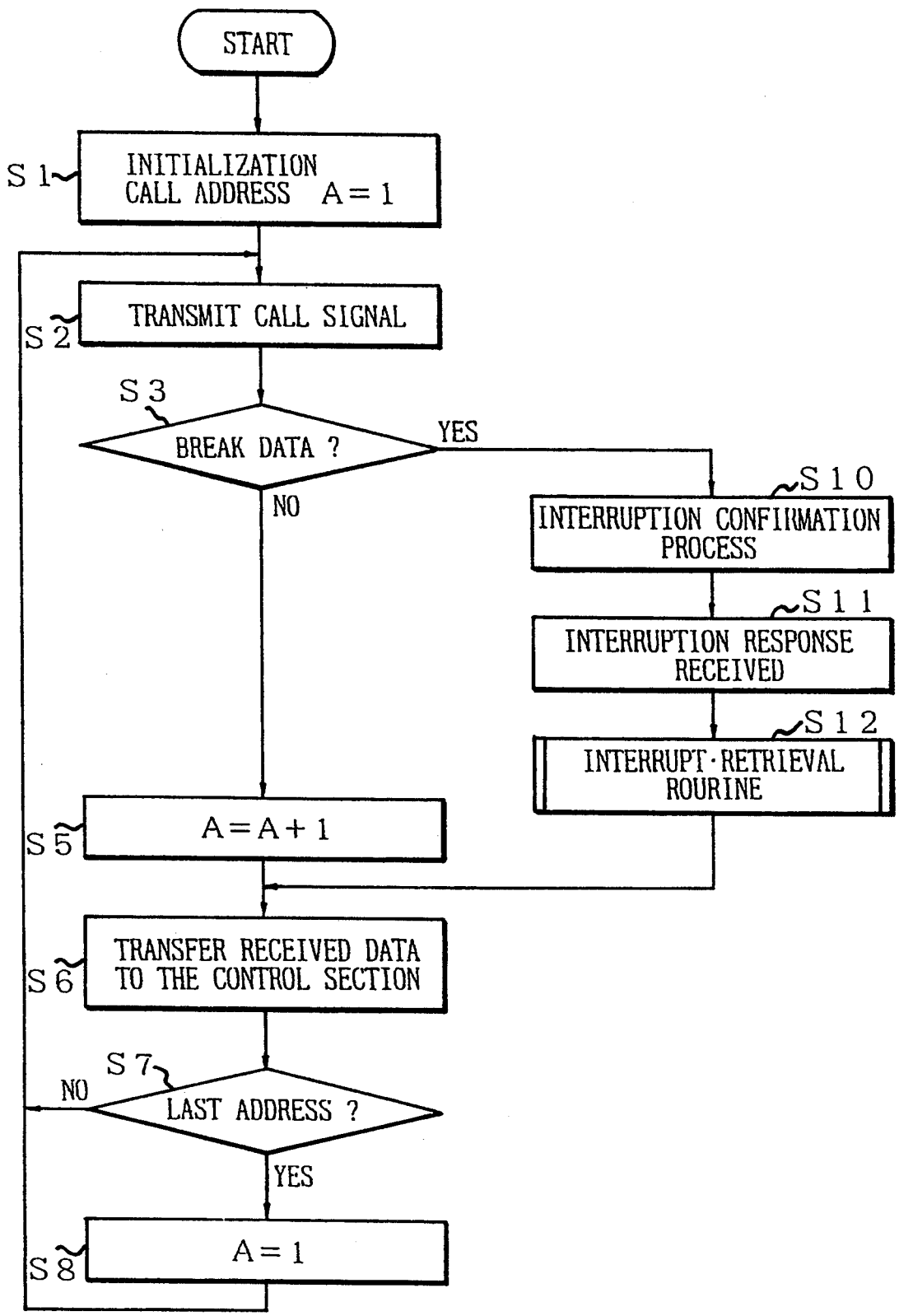
FIG. 9 is a flowchart showing the receiver control process in the present invention.

The control processings executed by the receiver shown in FIG. 2 will be described with reference to FIGS. 9 and 10.

In the flowchart shown in FIG. 9, when the receiver is turned on, initialization is conducted in step S1 (hereinafter, "step" is omitted), and an initial address is set in the calling address A, i.e., A=1. Next, a calling signal consisting of the calling command C1 and the initial address 1 is transmitted in S2, and then it is determined in S3 whether or not the terminal response received in response to the calling signal is break data. If the terminal response is not break data, the calling address A is incremented in S5, and the normal response signal received in S3 is transferred to the control section 32 in S6 so that necessary processing can be done.

Subsequently, it is determined in S7 whether or not the calling address is the final address. If the answer is negative, the process returns to S2 and a subsequent calling address is called. If the final address is called, the address A is initialized to 1 in S8, and the process returns to S2, and the terminal calling is repeated from the first terminal address.

If it is determined in S3 that break data is received, the receiver sends out the interrupt confirmation request to the terminal in S10. When the interrupt response data is received from the terminal in response to the interrupt confirmation request in S11, the interrupt/retrieval routine is executed in S12. The interrupt/retrieval routine is shown in FIG. 10 as a subroutine.

Figure 10:
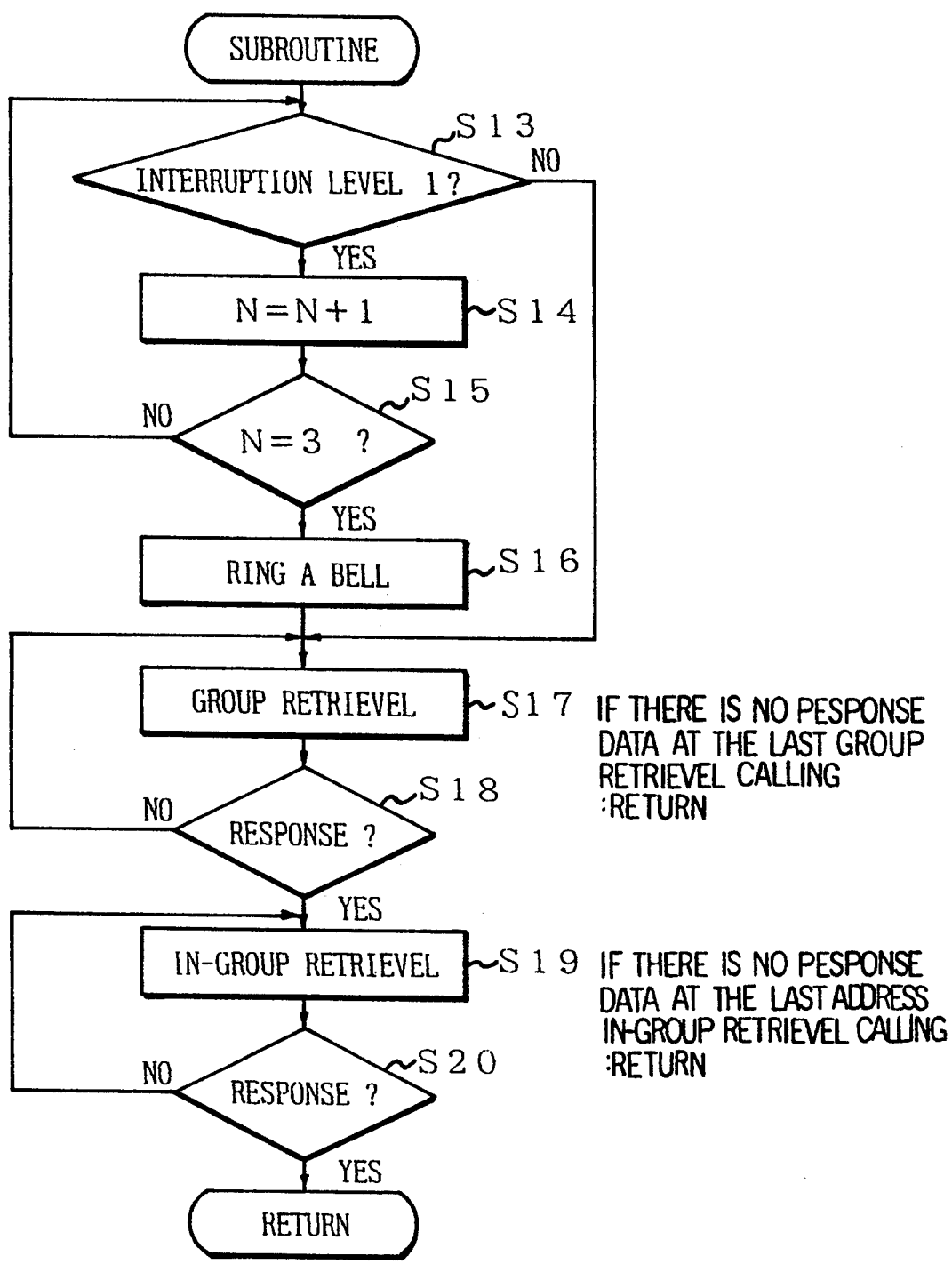
FIG. 10 is a flowchart showing the interrupt/retrieval routine in FIG. 9 as a subroutine.

In the subroutine shown in FIG. 10, the interrupt response data has interrupt level 1 when it is based on the detection output of the fire transmitter, interrupt level 2 when it is based on the detection output of the fire sensor, and interrupt level 3 when it is based on prealarming of the analog sensor. Interrupt levels 1 to 3 also indicate the order of priority of the interrupts. Prealarming of the analog sensor indicates that the analog fire detection signal has exceeded the level at which the receiving end performs fire determination process. Upon receipt of this prealarming signal, the receiver starts the fire determination process on the basis of the analog fire detection signal.

In the interrupt/retrieval routine shown in FIG. 10, it is determined in S13 whether or not the interrupt level is 1. If the interrupt level is 1, the counter N for indicating the number of times the interrupts are confirmed is incremented in S14. In the initial state, N=0. Next, it is determined in S15 whether or not N=3, i.e., whether or not the interrupt level 1 has been detected three times. If the number of times the interrupt level 1 is detected is less then 3, the process returns to S13 and it is determined whether or not the interrupt response signal has the interrupt level 1. If the interrupt level 1 has been detected three time, the process goes from S15 to S16 and fire alarms are activated. Thereafter, the group retrieval is conducted in S17. The reason why the determination, whether or not the interrupt level 1 has been detected three times, is carried out in S13 is that if the determination is caried out only one time there is a possibility that the interrupt response signal is a noise as occurring in a transmision path. Therefore high reliability of the data is held by the three times checking.

Figure 11:
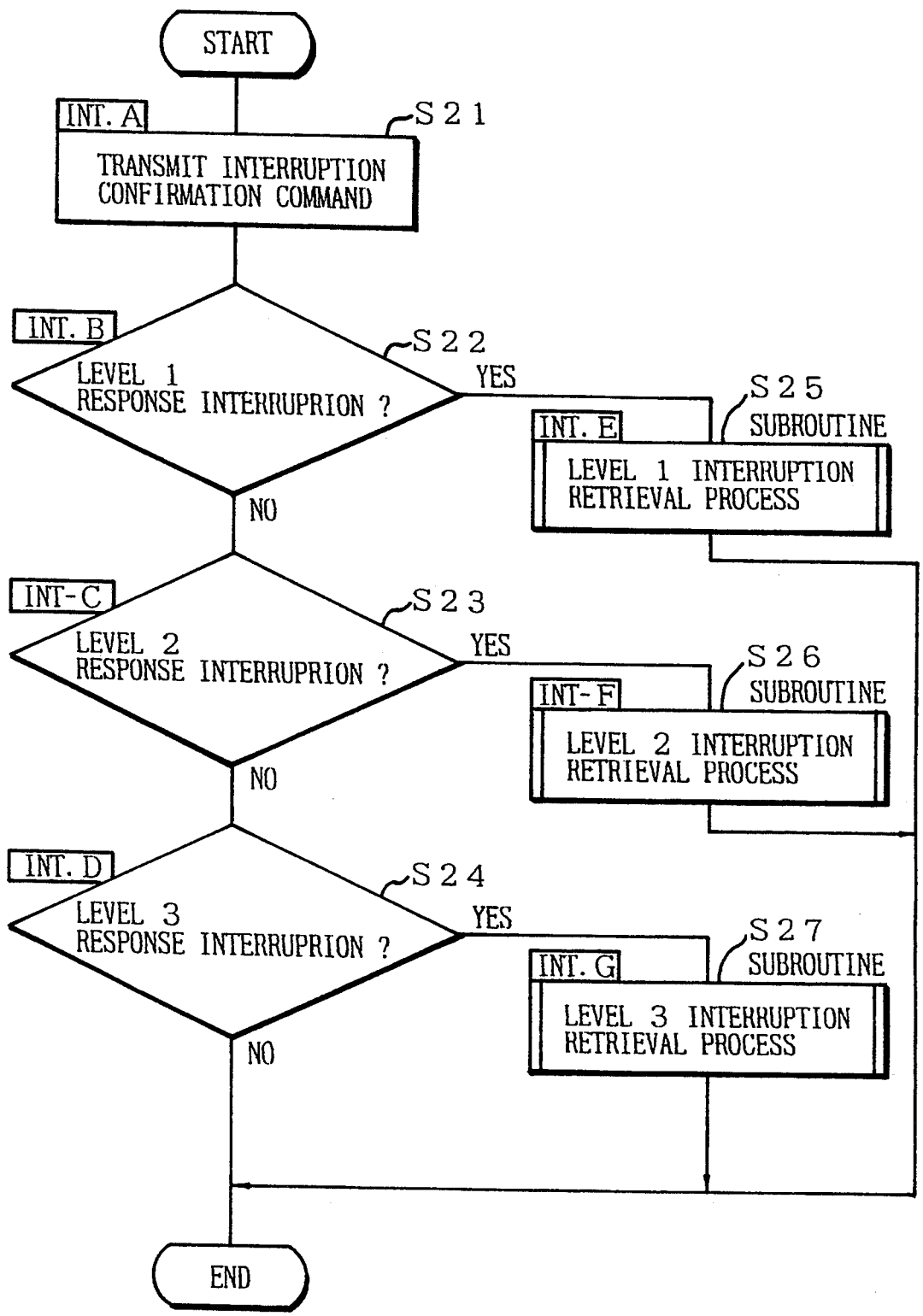
FIG. 11 is a flowchart showing the interrupt level confirmation process and the group calling process at each interrupt level.

If it is determined in S13 that the interrupt response signal has an interrupt level other than 1, the process steps over to S17 and group retrieval is executed. FIG. 11 shows the processings executed in this interrupt level confirmation operation. That is, the interrupt confirmation command is transmitted in S21, and then it is determined in S22 whether or not the response interrupt having the interrupt level 1 is received. If the response interrupt having the interrupt level 1 is received, the retrieval process at the interrupt level 1 is executed (S25). If the response interrupt received has the interrupt level 2, the retrieval process at the interrupt level 2, which is similar to the retrieval process at the interrupt level 1, is executed (S26). The retrieval process at the interrupt level 3 is similarly executed through S24 and S27.

Figure 12:
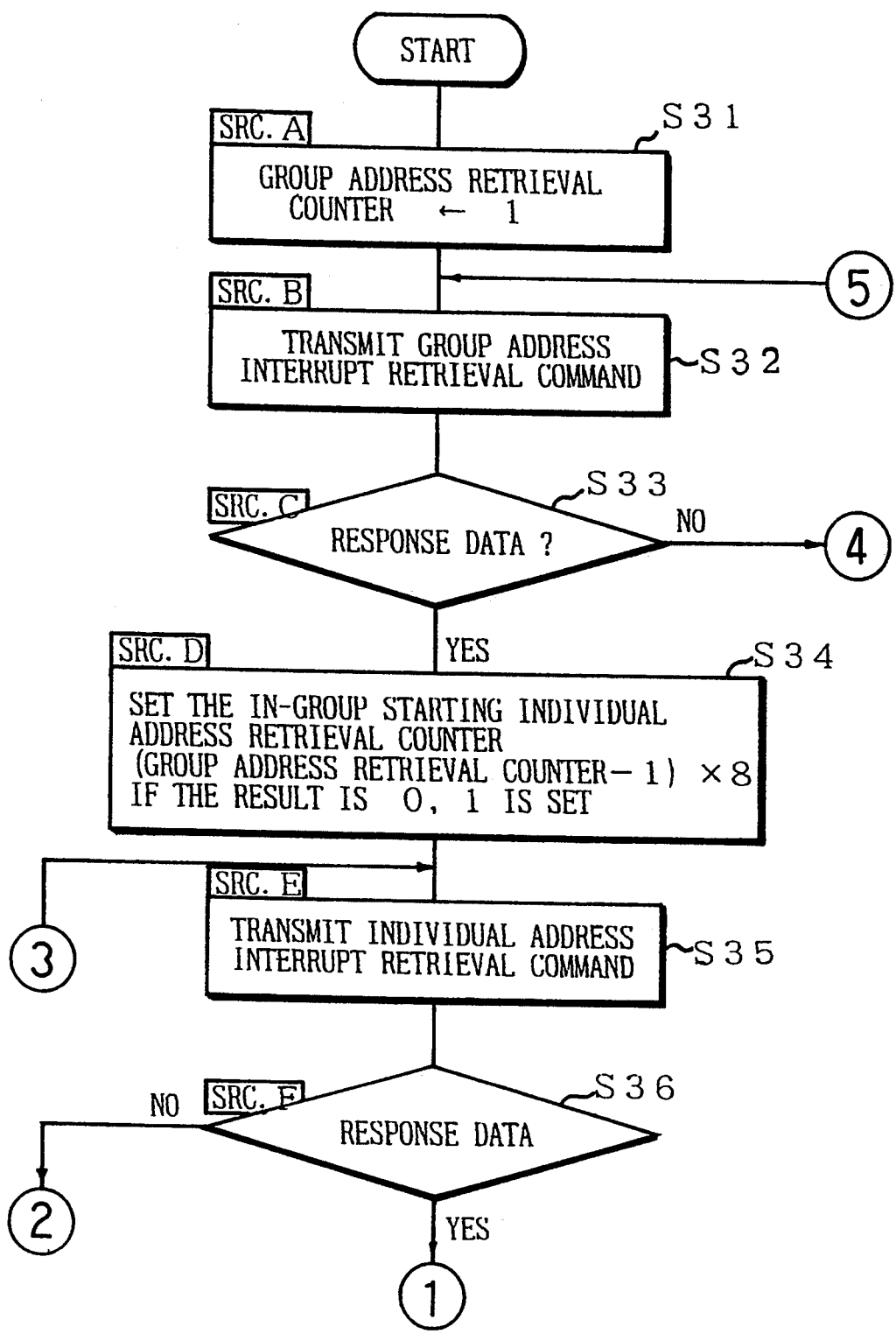
FIG. 12A and 12B are flowcharts showing the group and separate address retrieval processes.
Figure 12:
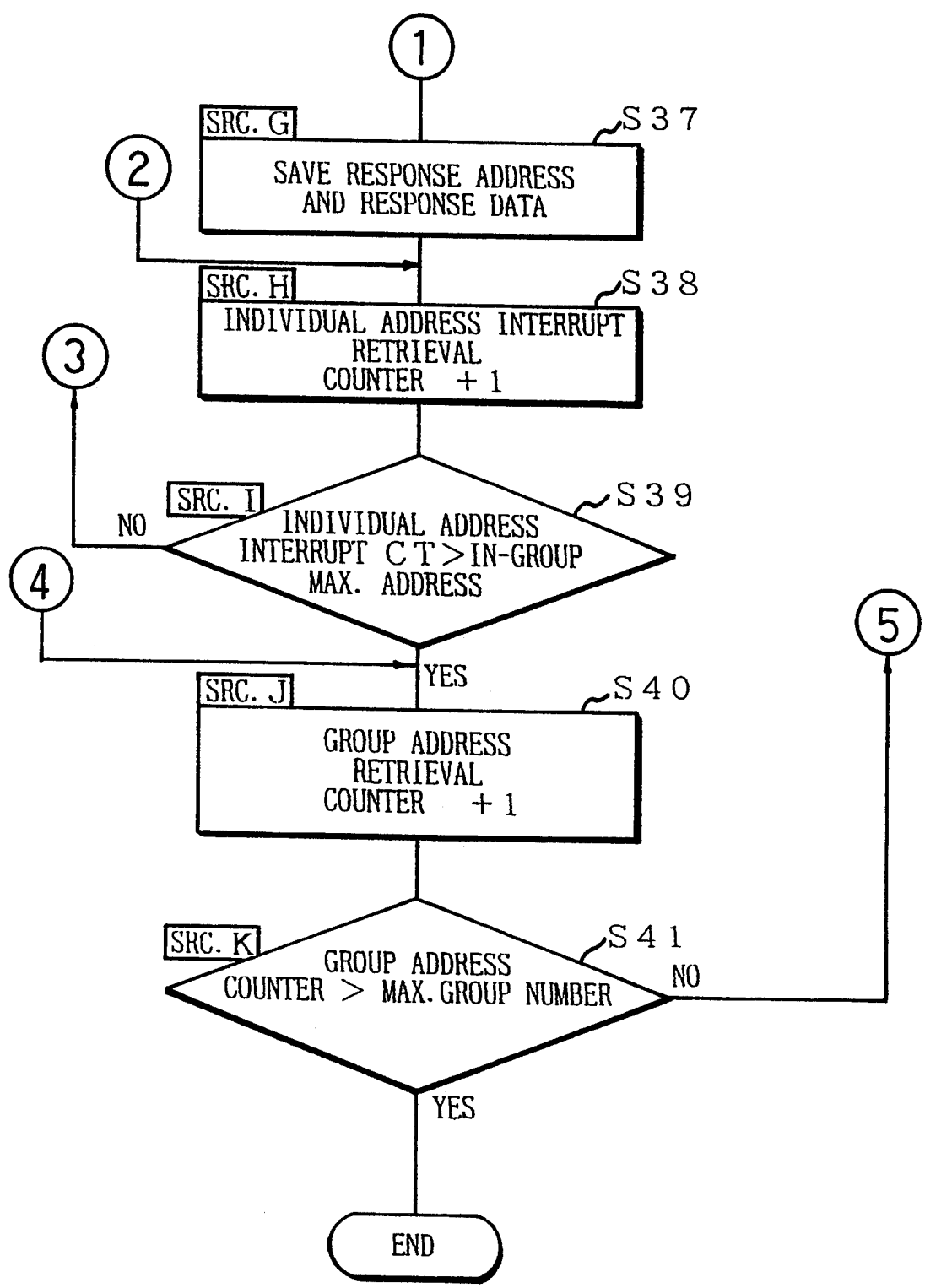

The group and separate address retrieval processings at each interrupt level will be described with reference to FIGS. 10 and 12A and 12B. In the subroutine shown in FIG. 10, the terminals are divided into groups each having a predetermined number of terminals, and group retrieval is executed. Therefore, the group address is updated in S17, and presence of the group response is checked in S18. If there is a response to the designated group address in S18, retrieval of the terminal in the specified group is executed in S19 to specify the terminal. If there is a response in S20, the terminal in which a fire is detected can be specified. Thereafter, the process returns to the main routine shown in FIG. 9 and the fire generated site is displayed. If there is no response to the calling of the last group address in the group retrieval S17 and to the calling of the last separate address in the in-group retrieval S19, the process returns to the main routine shown in FIG. 9. FIG. 12(A)(B) is a flowchart of the processings executed in the subroutines of S25, S26 and S27 in FIG. 11 and detailed description of the processings executed in S17, S18, S19 and S10 in FIG. 10. The group and separate address retrieval processes are executed in accordance with the procedures of this flowchart.

In FIGS. 12A and 12B, 1 is set to the counter for the group address retrieval in S31. Next, the group address retrieval command is transmitted in S32, that is, the group 1 is requested to respond to the inquiry about the presence of a terminal in which an abnormality is detected in the group 1. It is thus determined in S33 whether or not response data is received. If no response data is received, the counter is incremented in S40, and then it is determined in S41 whether or not the counter is larger than the maximum group number. If the counter is less than the maximum group number, the process returns to S32, and a subsequent group is retrieved. If the counter is equal to the maximum group number, the group address retrieval process at this interrupt level is completed.

If it is determined in S33 that the response data is received from the relevant group, the separate address retrieval is executed. As in the case of the group address retrieval process, response of each terminal in the group is requested, i.e., the terminal in the group in which an abnormality is detected is specified, by incrementing the counter in the separate address retrieval process. In S34, the starting separate address in the group is set in the counter for the separate address retrieval. At this time, the group 1 comprises the terminal 1-7 and after the group 2 comprises eight terminals (group 1: 1-7, group 2: 8-15, group 3: 16-23 . . . ). Therefore the value set in the counter is obtained by deducting 1 from the value set in the group address retrieval counter (S31) and by multiplying the resultant value by 8. If the obtained value is 0, 1 is set in the counter. When the value is set in the counter in S34, the separate address retrieval command is transmitted in S35. Thereafter, it is determined in step 36 whether or not a response data is received. If there is a response data, the address and the received response data are recorded (S37).

If no response data is received or when the address or the like is recorded in S37, the counter is incremented in S38. Thereafter, the value set in the counter is compared with the maximum address in the group in S39. If the value set in the counter is less than the maximum address, a subsequent value, i.e., a terminal having the subsequent separate address, is retrieved (S39). If the value set in the counter is equal to the maximum address, the separate address retrieval is completed, and the process goes to S40 to execute retrieval on a subsequent group.

To execute the aforementioned group and separate address retrieval processes, a retrieval command is set in the upper 4 bits in the command field shown in FIG. 5. In the lower 4 bits in the command field is disposed a binary code which indicates the contents of the retrieval command, e.g., "0000" in the case of the group address retrieval at the interrupt level 1 or "0011" in the case of the separate address retrieval at the interrupt level 1.

Figure 13:
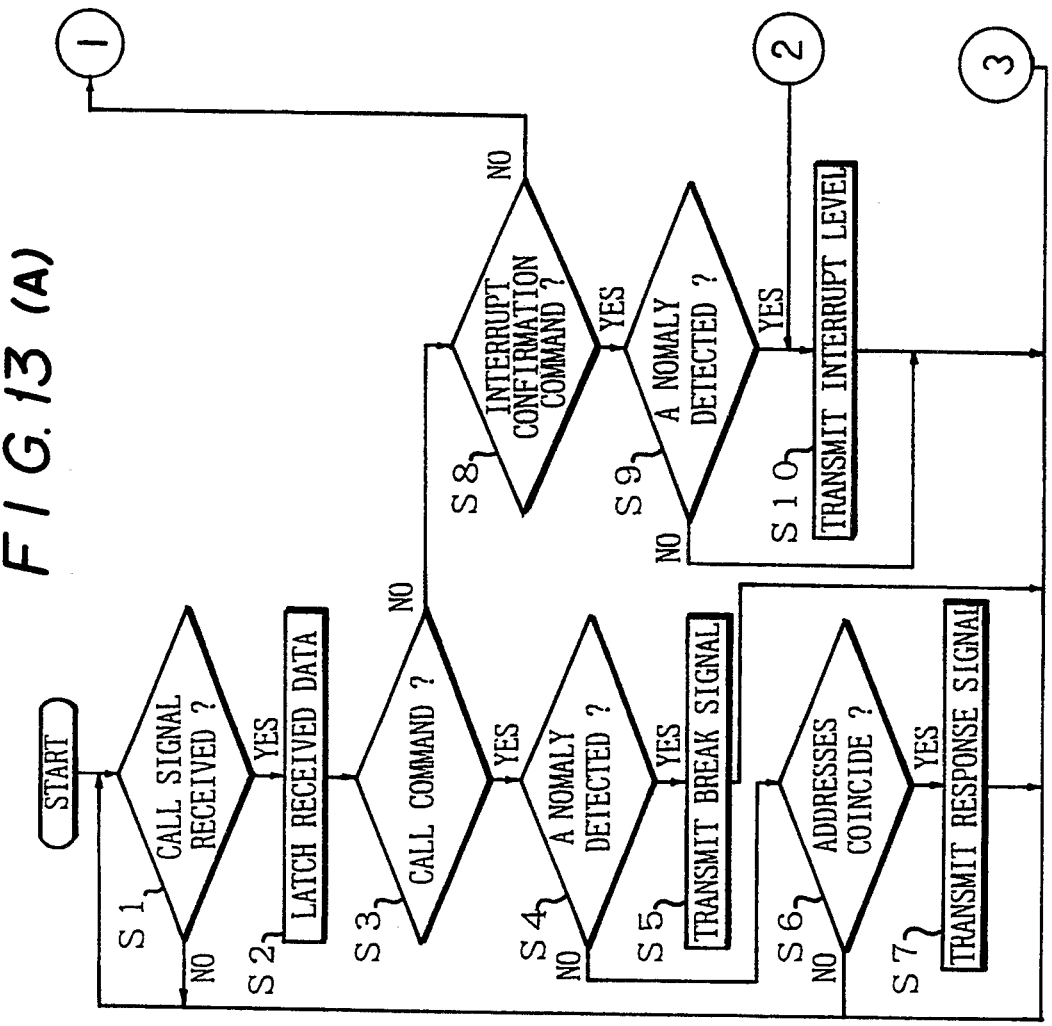
FIG. 13A and 13B are flowcharts showing the terminal control process in the present invention.
Figure 13:
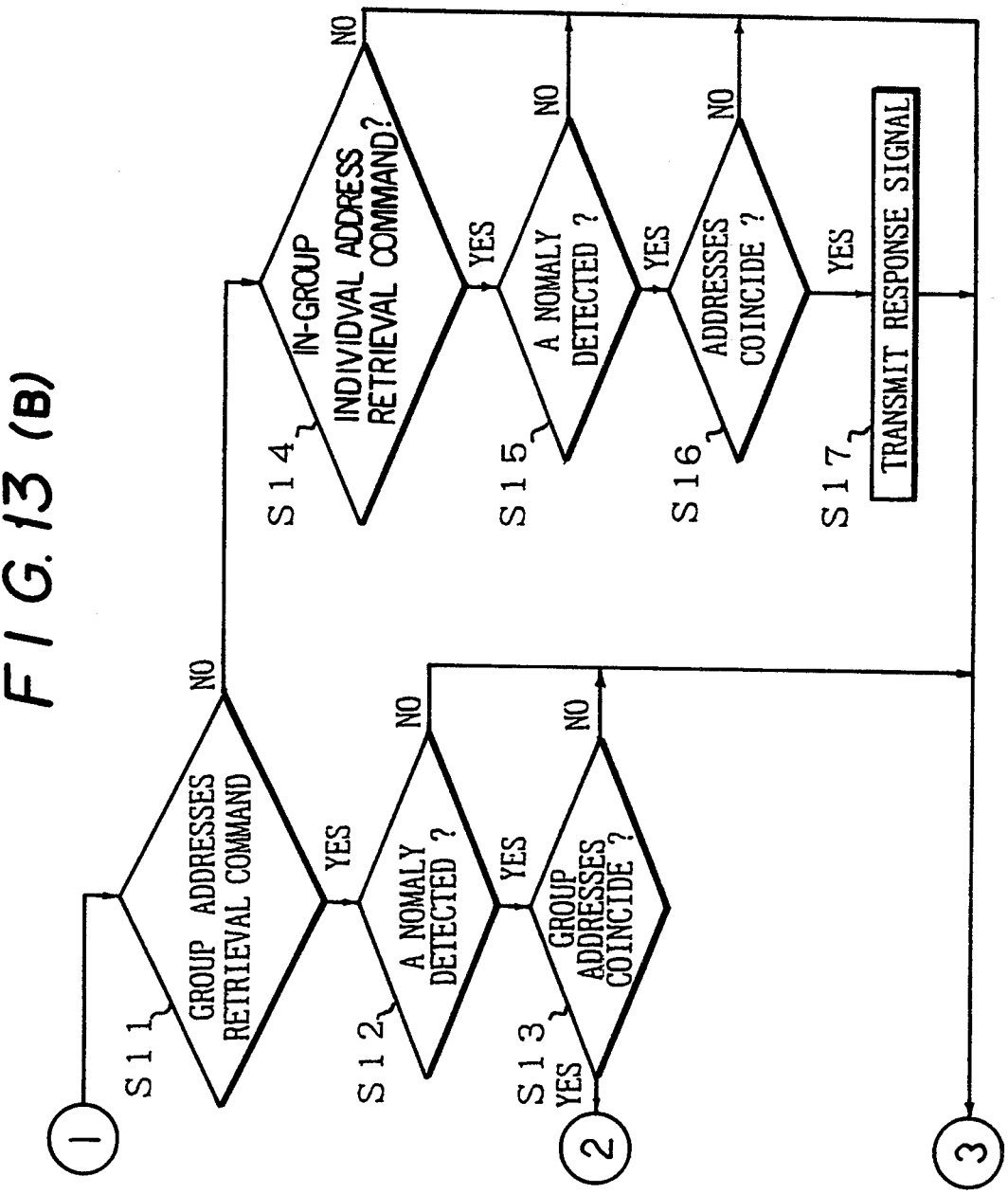

The control processings executed by the terminal shown in FIG. 2 will be described with reference to FIG. 13A and 13B. In FIG. 13A and 13B, it is determined first in S1 whether or not there is a calling signal from the receiver. If the calling signal is received, the received data is latched in the data buffer in S2, and then it is determined in S3 whether or not the received data is the calling command. If the received data is the calling command, it is determined in S4 whether or not an abnormality, such as a fire, is detected. If the abnormality is detected, a break signal is transmitted to the receiver in S5. If the abnormality is not detected it is determined in S6 whether or not the calling address of the received data coincides with the self address. If they are the same, a response signal is transmitted in S7.

When the interrupt confirmation signal is transmitted from the receiver 10 in response to the break signal sent in S5, the process goes from S3 to S8, and the interrupt confirmation command is confirmed. Thereafter, it is determined in S9 whether or not there is an abnormality. If an abnormality is detected, a terminal response signal indicating the interrupt level is transmitted in S10.

When the calling signal for group calling is sent from the receiver 10 in response to the terminal response signal indicating the interrupt level, the process goes from S8 to S11, and it is determined in S11 whether or not the received calling signal is a retrieval command to retrieve a group address. Thereafter, it is determined in S12 whether or not an abnormality is detected. If an abnormality is detected, it is determined in S13 whether or not the group address in the calling signal coincides with the group address. If they coincide with each other, the interrupt level in S10 is transmitted as a group response signal. When the receiver 10 sends out a retrieval command in which a terminal address in the specified group is separately set in response to the response signal, it is determined in S14 that the received retrieval command is an in-group individual address retrieval command, and then it is determined in S12 whether or not an abnormality is detected. If an abnormality is detected, collation of the addresses is performed in S16. If it is determined S16 that the separate address in the calling signal is the same as the separate address of the relevant terminal, a response signal, containing abnormality detection data, is transmitted in S17. The receiving end thus specifies the terminal in which an abnormality is detected.

In the aforementioned embodiment, break data, consisting of pulses having only logical high levels is transmitted from a terminal to the receiver to notify an interrupt. However, any break signal can be used so long as it can invalidate the contents of a normal response signal.

Furthermore, interrupt levels 1 to 3 are used in the aforementioned embodiment. However, the number of interrupt levels and the relationship between the interrupt levels and the retrieved state can be adequately determined.

Furthermore, when the fire detection output having the interrupt level 1 has been received consecutively three times, fire alarms are activated. However, fire alarms may be activated when the fire detection output having the interrupt level 1 is received once or at least twice.

What is claimed is:

1. An anti-disaster monitoring system comprising a plurality of terminals; a receiver connected to said plurality of terminals through a transmission path, said receiver including means for calling the terminals in sequence by transmitting calling signals each of which designates the address of one of said terminals, said terminals including means for transmitting a terminal response signal when an address designated in the calling signal coincides with a self-address of a terminal, and in which said receiver decodes the received terminal response signal and performs alarming or the like, each of said terminals having a group address setting section for setting a group address of a group consisting of a predetermined number of terminals on the basis of the self-address, and an interrupt transmitting section for transmitting a break signal which invalidates the terminal response signal on a timing when the terminal response signal is transmitted to said receiver from any of said terminals when an abnormality is detected to notify generation of an interrupt, and in that said receiver has an interrupt detection section for detecting an interrupt of the terminal when it receives the break signal on a timing when the terminal response signal is received, a calling control means for performing a sequential group calling by designating the group addresses when an interrupt detection output is obtained from said interrupt detection section, and a specification means for specifying the terminal in the group when a response signal is obtained from the group containing the terminal in which an abnormality is detected in response to the group calling made by said calling control means, said receiver having means for transmitting the calling signal for interrupt confirmation to the terminals when said interrupt detection section determines an interrupt from the received break signal to allow the terminal to transmit an interrupt level signal which indicates the cause of generation of the interrupt, and said interrupt level signal indicating an order of priority of the process for specifying the terminal in which an abnormality is detected on the basis of the abnormality detection data indicating the cause of generation of the interrupt.

2. The anti-disaster monitoring system according to claim 1, wherein each said terminal has a transmission control section for setting an interrupt transmission time in which a plurality of interrupt level signals (interrupt type signals) having different orders of priority can be transmitted when the calling signal for interrupt confirmation is received from said receiver and for allocating the transmission timings of interrupt pulses in accordance with the orders of priority of the abnormality detection data.

3. The anti-disaster monitoring system according to claim 1, wherein said receiver specifies the terminal in which an abnormality is detected by sequentially designating the self addresses of the terminals in the group and thereby sequentially calling said terminals when the response signal is obtained from the group containing the terminal in which the abnormality is detected in response to the group calling made by designating the group address by said calling control means.

4. The anti-disaster monitoring system according to claim 1, wherein said receiver specifies the terminal in which an abnormality is detected by sequentially narrowing the number of terminals to which the calling signal is to be transmitted when the interrupt level signal is received, said narrowing being achieved by sequentially dividing said terminals in the group from which the abnormality detection response signal is obtained into two groups and by transmitting the calling signal to each of said terminals to check the presence of the abnormality detection terminal in the group.

5. The anti-disaster monitoring system according to claim 4, wherein said receiver performs specification of the abnormality detection terminals starting with the abnormality detection terminal in which an abnormality having a higher order of priority is detected on the basis of the order of priority of the interrupt level signals.

6. The anti-disaster monitoring system according to claim 5, wherein said interrupt transmission section sets an interrupt transmission time between the calling signal from said receiver and the terminal response signal, said interrupt transmission time having a predetermined period of time in which a plurality of interrupt pulses are sequentially transmitted with empty times intervening between the interrupt pulses, said interrupt transmission section selectively transmitting the particular interrupt pulses corresponding to the types of the detection data when an abnormality is detected.

7. An improved anti-disaster monitoring system, comprising: a plurality of terminals; a receiver connected to said plurality of terminals through a transmission path, said receiver including means for calling the terminals in sequence by transmitting calling signals each of which designates an address of one of said terminals, said terminals including means for transmitting a terminal response signal when a calling address coincides with a self address of a terminal, and in which said receiver decodes the received terminal response signal and performs alarming, and each of said terminals having an interrupt transmitting section for transmitting a break signal which invalidates the terminal response signal on a timing when the terminal response signal is transmitted to said receiver from any of the terminals over an entire terminal response signal returning period when an abnormality is detected to notify generation of an interrupt, and said receiver having an interrupt detection section for detecting an interrupt of a terminal when said receiver receives the break signal on a timing when the terminal response signal is received, said receiver having a means for transmitting the calling signal for interrupt confirmation to the terminals when said interrupt detection section determines an interrupt from the received break signal to allow the terminal to transmit an interrupt level signal which indicates the cause of generation of the interrupt and said interrupt level signal indicating an order of priority of the process for specifying the terminal in which an abnormality is detected on the basis of abnormality detection data indicating the cause of generation of the interrupt, whereby alarming can be performed initially by any one of said interrupt transmitting sections, and thereafter the terminal in which an abnormality is detected can be identified by said receiver of said anti-disaster monitoring system.

8. A method of performing an interrupt of an abnormality detection signal, said method being carried out in an anti-disaster monitoring system in which a receiver is connected to a plurality of terminals through a transmission path, comprising the steps of said receiver calling said terminals in sequence by transmitting calling signals each of which designates an address of the terminal, the terminals transmitting a terminal response signal when the address coincides with a self-address of a terminal, and the receiver decoding the received terminal response signal and performing alarming, the terminals breaking the terminal response signal to said receiver over an entire terminal response signal returning period; and each of said terminals having an interrupt transmitting section for transmitting a break signal which invalidates the terminal response signal on a timing when the terminal response signal is transmitted to said receiver from any of the terminals over the entire terminal response signal returning period when an abnormality is detected to notify generation of an interrupt, and said receiver having an interrupt detection section for detecting an interrupt of a terminal when said receiver receives the break signal on a timing when the terminal response signal is received; and said interrupt level signal indicating an order of priority of the process for specifying the terminal in which an abnormality is detected on the basis of abnormality detection data indicating the cause of generation of the interrupt, whereby alarming can be performed initially by any one of said interrupt transmitting sections, and thereafter the terminal in which an abnormality is detected can be identified by said receiver of said anti-disaster monitoring system.

* * * * *